Patented June 7, 1949

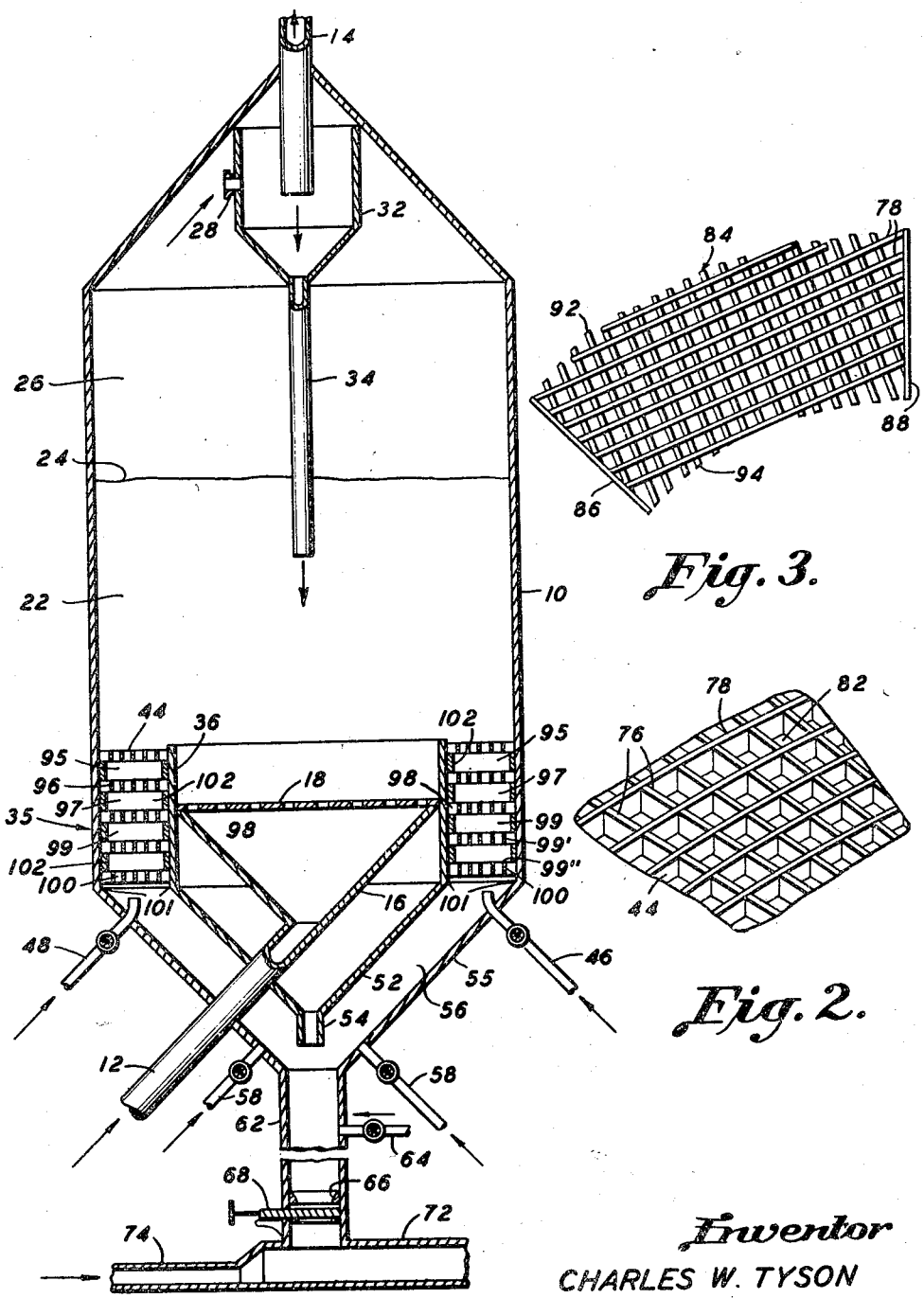

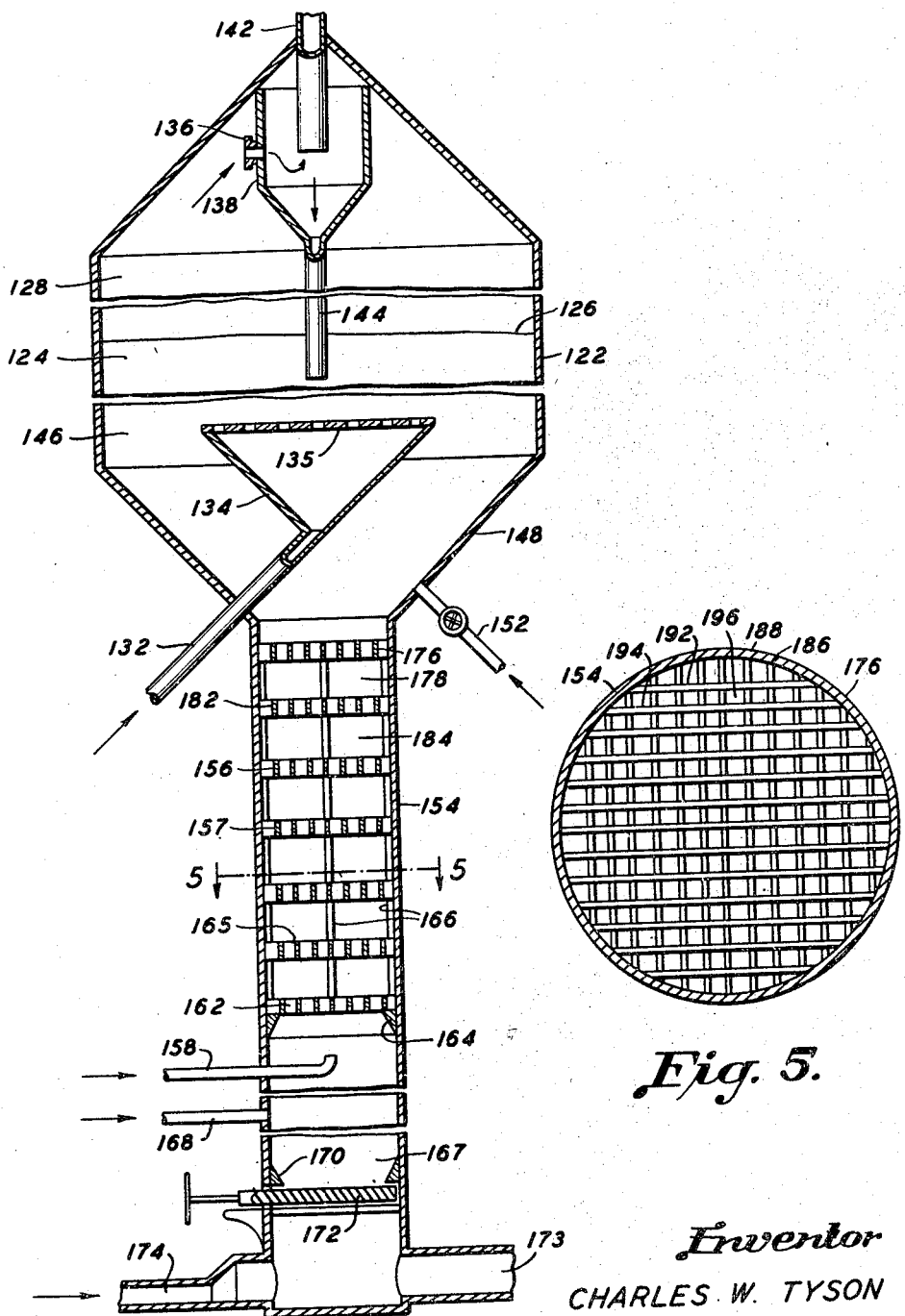

2,472,502

UNITED STATES PATENT OFFICE 2,472,502

APPARATUS FOR STRIPPING FINELY DIVIDED SOLIDS

Charles W. Tyson, Summit, N. J., assignor to Standard Oil Development Company, a corporation of Delaware Application July 28, 1945, Serial No. 607,639

2 Claims. (Cl. 23—288)

This invention relates to stripping solid particles, and more particularly, relates to removing vapors or gases from between solid particles in operations where the solid particles are suspended in gas and act like a fluid.

In many operations solid contact particles, after removal from a reaction zone, contain entrained or adsorbed vapors or gases which should be recovered or removed from the solid particles. For example, in the catalytic conversion of hydrocarbons, such as catalytic cracking, the finely divided contact particles containing catalyst become fouled and have to be removed from the reaction zone and regenerated.

On withdrawal from the conversion zone or reaction zone, the contact particles entrain vaporous reaction products which are usually removed by a stripping step. The contact particles are stripped with a stripping gas, such as steam, flue gas, inert gases, etc. If the vaporous reaction products are not removed from the mixture of contact particles, they pass with the contact particles to the regeneration zone where they are burned and this burning may result in unduly high temperatures in the regeneration zone. Combustion of these vaporous products will require extra air compression, larger vessels, etc., without increasing correspondingly the catalytic cracking capacity of the plant. If proper stripping is obtained, the vaporized reaction products may be removed and recovered and not lost by burning in the regeneration zone.

In the newer type of catalytic conversion units for hydrocarbons, catalyst or contact particles are removed as a dense fluidized liquid-simulating mixture from the reaction zone, and it has been extremely difficult to obtain efficient stripping of the contact particles in these units. In some of the previous stripping vessels there is undesirable circulation of the catalyst or contact particles carrying entrained vapors within the stripping vessel and between the inlet and outlet of the stripping vessel. This has occurred without adequate dispersion of the solid particles in the stripping gas with the result that some of the unstripped hydrocarbons or vapors in effect by-pass the stripping vessel and are carried along with the contact particles to the outlet of the stripping vessel and passed to the regeneration zone.

According to my invention, the stripping vessel or zone is divided into sections or zones arranged one above the other by spaced horizontally extending perforated sections, baffles or partitions, such as subway grating or similar lattice-work or material of open mesh construction so as to insure efficient staging and so that countercurrent stripping is obtained. The stripping is carried out in a countercurrent operation such that the contact particles move downwardly in a direction countercurrent to the upflowing stripping gas. The stripping is carried out in a stripping vessel supplied with means which insures adequate dispersion and staging to prevent bypassing of unstripped hydrocarbons to the outlet of the stripping vessel. As many stages are used as are practical.

The catalyst or contact particles in dense fluidized liquid-simulating condition are withdrawn from the bottom portion of the reaction zone and flow into the top of the stripping vessel or zone provided with the perforated partitions above mentioned. A stripping gas is introduced into the bottom of the stripping vessel or zone through one or more lines and flows upwardly countercurrent to the downflowing solid contact or catalyst particles.

By providing the perforated partitions, better stripping is obtained and the amount of hydrocarbons carried over from the reaction zone to the regeneration zone is reduced to a minimum.

In one form of my invention the stripping zone is annular and is arranged beneath the reaction zone. In another form of my invention the stripping zone or vessel comprises a vertical column extending from the bottom of the reaction vessel.

In the drawings:

Fig. 1 represents a vertical longitudinal section through a reaction vessel and its associated parts, the vessel being provided with an annular stripping zone subdivided into sections by perforated baffles comprising subway grating;

Fig. 2 represents a perspective view of a portion of one form of perforated partition, and more particularly, subway grating;

Fig. 3 represents a top plan view of one section of a perforated partition used in the annular stripping zone;

Fig. 4 represents another form of stripping zone and comprises a vertical longitudinal section taken through a reaction vessel and the columnar stripping vessel beneath the reaction vessel; and Fig. 5 represents a horizontal transverse section taken substantially on line 5—5 of Fig. 4 to show the top of one subway grating section.

Referring now to the drawing, and more particularly to Fig. 1, the reference character 10 designates a cylindrical reaction vessel provided with a feed inlet 12 and a top outlet 14 for the removal of vapors or gases. In the form of reaction vessel shown in Fig. 1, the solid contact particles and the reactants are introduced through line 12 as a mixture. If desired, the reactants and contact particles may be separately introduced into the reaction vessel 10.

The inlet line 12 is provided at its inner end with an inverted conical head 16 provided at its upper portion with a horizontally arranged perforated grid member 18 for distributing the reactants and solid particles across the area of the reaction vessel 10. The inverted conical member 16 is concentrically arranged in the bottom portion of the reaction vessel 10. The distribution grid member 18 is circular.

The reactants are preferably introduced into the reaction vessel as vapors or gasses and the velocity of the gases or vapors flowing upwardly through the reaction vessel 10 is selected to maintain the solid particles as a dense fluidized liquid-simulating mixture 22 having a level 24 with a dilute phase or dilute suspension 26 above the level 24.

In the catalytic conversion of hydrocarbons, the hydrocarbons in vapor form or in liquid form are mixed with the contact particles. If the hydrocarbons are in liquid form, a sufficient amount of hot regenerated catalyst or contact particles must be used to supply enough heat to vaporize the hydrocarbons and to supply the heat of conversion. In the catalytic conversion of hydrocarbons, the temperature in the reaction zone 10 may be between about 750° F. and 1050° F. For catalytic cracking, the catalyst may be acid-treated bentonite clay, synthetic silica alumina gel, synthetic silica magnesia gel, etc. For other catalytic conversions of hydrocarbons suitable catalysts may be used.

The catalyst or contact particles are preferably in powdered condition having a particle size between about 200 and 400 mesh or finer with up to 40 or 50% of 0 to 20 micron material. Coarser catalyst or contact particles may be used, if desired. For maintaining the contact particles in a fluidized condition, the superficial velocity of the gaseous fluid may vary between about 0.3 foot per second and 2.0 feet per second. The superficial velocity is that velocity of the gaseous fluid passing through the vessel 10 with no contact particles present in the vessel. With these velocities, the powdered silica-alumina material has a density of about 30 lbs./cu. ft. to 8 lbs./cu. ft.

The vaporous reaction products in the dilute suspension or dilute phase 26 contain entrained contact particles and these vaporous products are passed through opening 28 into a cyclone separator 32 arranged in the upper portion of the reaction vessel 10. Other forms of separating devices may be used and more than one separating device may be used, if desired. In the separator 32 a large part of the entrained solid particles are removed from the vaporous reaction products which leave the reaction vessel through outlet 14. The separated solid particles are collected in the separator 32 and are passed through dip pipe 34 to the dense fluidized bed or mixture 22 in the reaction vessel 10.

During the conversion, the contact particles become fouled with combustible material and the particles must be regenerated before they are further used in a conversion operation. Before regeneration it is preferred to strip volatile material from between the catalyst or contact particles. In the form of the invention shown in Fig. 1, the contaminated catalyst or contact particles are withdrawn from the bottom of the dense bed or mixture 22 and passed through an annular stripping section 35. This stripping section 35 is formed between vertical sleeve 36 which surrounds and is concentric with the distribution grid member 18 and the lower inner portion of the wall 38 of the reaction vessel 10. The sleeve 36 extends above and below the distribution grid member 18.

The stripping section 35 is provided with a plurality of spaced perforated sections or partitions 44 which will presently be described in greater detail. The contaminated contact particles flow into the upper portion of the stripping section 35 and pass downwardly countercurrent to stripping gas introduced at the lower portion of the stripping section 35 through inlet lines 46 and 48. While I have shown only two stripping gas inlets on the drawing, it is to be understood that a large number of these inlets is preferably used and arranged in a circle in order to introduce stripping gas at the bottom of the stripping section at a plurality of points.

The lower portion of the sleeve 36 is closed off by an inverted conical member 52 provided with a small opening at the apex of the cone as at 54. This conical member 52 is provided to reduce the volume of the passageway through which the stripped catalyst or contact particles pass after leaving the stripping zone or section 35. Gas may be introduced through any suitable opening such as opening 54 to remove accumulated dust.

The stripped contact particles leaving the stripping section 35 pass between the conical member 52 and the conical bottom portion 55 of the reaction vessel 10 through passageway 56. If desired, fluidizing gas or stripping gas may be introduced into line or lines 58 into the bottom portion of the conical bottom 55 to maintain the particles in fluidized condition as they pass into standpipe 62 which communicates with the bottom 55 of the reaction vessel 10. Preferably one or more fluidizing lines 64 are provided for introducing fluidizing gas into the standpipe 62 to maintain the particles in a fluidized liquid-like condition so that they build up a hydrostatic pressure at the base of the standpipe.

The bottom of the standpipe 62 is provided with a valve seat 66 and a slide valve 68 for controlling the rate of withdrawal of solid particles from the standpipe. The stripped contaminated particles are then passed through the valve opening into line 72 where they are mixed with regenerating gas, such as air, introduced through line 74, and this mixture is passed to a regeneration zone (not shown) where combustible material is burned from the contact particles. After regeneration the hot regenerated catalyst or contact particles are returned to the reaction zone or vessel 10 through line 12.

In Fig. 2 I have shown a perspective view of a portion of one of the perforated partitions diagrammatically shown in Fig. 1 in the stripping zone or section 35. The perforated partition comprises subway grating or similar material of open mesh construction. Flat vertical strips 76 are arranged in spaced parallel relation and are connected in any suitable manner by other parallel spaced strips 78 arranged at right angles to the first mentioned strips to form rectangular cells 82. The individual strips of metal may be from 1/8" to 1/4" and the depth of the grating may be from about 1½" to 3" but grating of different sizes than those given may be used.

With a subway grating construction, a relatively open mesh section is obtained having considerable strength and the section is provided with great porosity so that catalyst or contact particle flow downward will not be unduly obstructed. At the same time recycling of the catalyst from one zone to the other is substantially eliminated.

As pointed out above, the stripping section or zone 35 is annular and the perforated partition members 44 may be made in annular form to fit into the annular stripping section. However, due to the large size of some of the reactors, it is preferable to subdivide the partition plates into smaller sections which are more easily handled.

Fig. 3 I have shown one section of subway grating or similar perforated partition material and have designated this section with the reference character 84. The ends of the section are preferably but not necessarily provided with radial flat strips 86 and 88 to cover the ends of the grating and to more easily fit the sections together in the stripping section 35. The sides of the section 84 are arcuate with their centers on the center of the reaction vessel 10. These arcuate sides are designated 92 and 94, the side 92 being the longer outer side and the side 94 being the shorter inner side. The arcuate section shown in Fig. 3 is made up of parallel strips of metal arranged as above described and shown in Fig. 2.

Referring now to Fig. 1, the contaminated catalyst or contact particles flow downwardly from the dense fluidized bed or mixture 22 in the reaction vessel 10 and into the upper portion of the stripping section or zone 35. The particles first pass down through the openings in the top perforated partition or subway grating section 44 wherein they are subdivided into a plurality of streams and are intimately contacted with the stripping gas passing upwardly through the stripping section 35.

After passing through the top perforated plate 44, the particles converge into a single stream and pass into the stripping space 95 below the top perforated partition 44 and the particles are contacted with the upflowing stripping gas. The particles are intimately mixed with the gas as a fluidized liquid-simulating turbulent mixture in the stripping space 95. The grating section 44 prevents substantial recirculation of solid particles from space 95 to the reaction zone 10 but is of sufficient porosity to not obstruct the downward flow of particles.

The contact particles then pass down through the openings in the next lower perforated section or annular member 96 of subway grating wherein the single stream is again subdivided into a plurality of separate streams during which time the contact particles are again contacted with the upflowing stripping gas. After passing through this next lower perforated annular member 96, the contact particles again converge into a single stream in the stripping space 97 below the perforated annular member 96 where they are contacted with the upflowing stripping gas and again formed into a dense fluidized liquid-like turbulent mixture so that intimate contact between the particles and gas is obtained.

From this space 97 the contact particles flow down through the openings in the next lower plate 98 wherein they are again subdivided into a plurality of streams and passed to the stripping space 99 below the plate 98 wherein the separate streams again converge into a single stream and then through plate 99' and then through space 99". The particles in passing downwardly through the stripping section 35 alternately pass through the openings in the perforated annular members and the stripping spaces between the annular members until they reach the lowest perforated annular member 100. After passing through the openings in the bottom perforated annular member 100, the particles are substantially completely stripped of vapors and are passed through passageway 56, as above described.

The stripping gas, in flowing upwardly through the stripping section 35, removes strippable material, such as hydrocarbon vapors, from between the contaminated contact particles. The stripping gas and the vapors stripped out of the catalyst pass upwardly from the top of the stripping section 35 into the reaction vessel 10 and pass out with the reaction vapors through line 14. By providing the spaced annular perforated members or sections made of open mesh material such as subway grating, overall circulation of the catalyst in the stripping vessel 35 is minimized and substantially all of the contact particles pass down through one perforated member or section to the space therebelow, then through the next perforated member and to the space below that, etc., so that the contact particles all remain in the stripping section for about the same period of time and are all subjected to about the same amount of stripping. In this way, more efficient stripping is obtained than in strippers where no perforated partitions are used.

The perforated annular members are supported in the annular stripping section or zone in any suitable manner. In the form shown in the drawing, the bottom perforated annular member 100 is supported on ledges 101 which project from the inner wall of the reaction vessel 10 and from the outer wall of the sleeve 36. These ledges 101 may be formed as a continuous annular ledge extending around the stripping section or they may be separated ledges spaced at intervals for supporting the bottom perforated annular member 100.

The perforated annular members arranged above the bottom member 100 are spaced from the bottom member 100 and from each other by pins or legs 102 extending from the bottom of each section of grating. Preferably three of such legs are provided for each section of the perforated members. These legs or pins support the upper sections of the perforated partitions and at the same time space them from each other.

In a catalytic cracking of hydrocarbons, the temperature of the contaminated catalyst particles passing to the stripping zone or section 35 are at a temperature of about 750° F. to 1050° F. The stripping gas is preferably steam at a temperature of about 300° F. The superficial velocity of the steam passing upwardly through the stripping section is about 0.5 ft./second to 2.0 ft./second. The amount of stripping gas should be at least 1 volume of gas per volume of catalyst and preferably 2 to 10 volumes of stripping gas per volume of catalyst passing downward.

Referring now to Fig. 4, the reference character 122 designates a reaction vessel containing a dense fluidized liquid-simulating bed or mixture of contact particles having a level shown at 126 and a dilute phase or dilute suspension 128 thereabove. The reaction vessel is provided with an inlet line 132 for introducing reactants and solid particles. The inner end of the inlet line 132 is provided with an inverted conical member 134 arranged concentrically in the bottom of the reaction vessel 122. The conical inlet member 134 is provided with a horizontal circular distribution grid member 135 for distributing the solid particles and reactants evenly across the area of the reaction vessel 122.

The vaporous reaction products passing through the dilute phase 128 contain entrained solid particles, and in order to recover some of the entrained particles, the vapors are passed through opening 136 of cyclone separator 138. Other separating devices may be used and more than one separating device may be used, if desired. In the separator 138 a large part of the solid particles is separated from the vapors with the vapors passing overhead through line 142. The vapors may be passed to any suitable separating equipment to recover desired products. In the catalytic conversion of hydrocarbons, the vapors are passed to a fractionating system for recovering motor fuel or other desired products.

The separated solid particles collect in the bottom of the cyclone separator 138 and are withdrawn therefrom through dip leg 144 which returns the solid particles to the dense bed or mixture 124 below the level 126 thereof.

During the reaction the catalyst or contact particles become contaminated with combustible material and after the reaction it is preferred to strip the contact material to remove vaporous material therefrom. The contaminated catalyst or contact particles are passed downwardly into the annular space 146 surrounding the conical inlet member 134 and passed into the passageway between the conical inlet member 134 and the bottom conical wall 148 of the reaction vessel 122.

Preferably, fluidizing gas or stripping gas is introduced into the catalyst or contact particles passing through the bottom portion of the reaction vessel 122 through one or more lines 152 to maintain the particles in a dry dense fluidized condition while effecting some stripping.

The fluidized contaminated solid particles are then introduced into the upper portion of a stripping zone or vessel 154 which is shown as extending downwardly vertically from the bottom portion of the reaction vessel 122. The stripping vessel 154 is shown as a cylindrical vessel with its open upper end communicating with the bottom open end of the reaction vessel 122.

The stripping vessel 154 is subdivided into sections by spaced perforated circular sections as, for example, 156 and 157. These perforated partitions are preferably made of subway grating or of similar open mesh construction in which flat strips of metal are connected together to form rectangular or other openings as will be hereinafter described in greater detail in connection with Fig. 5. The partitions are maintained in spaced relation as will be presently described.

Stripping gas is introduced into the bottom of the stripping section 154 through line 158. One or more lines may be used for introducing stripping gas. Instead of adding all of the stripping gas at the bottom of the stripping zone or vessel 154, additional amounts of stripping gas may be introduced below any of the other perforated partition plates or discs or all of them.

The bottom perforated disc or plate member 162 is supported by ledge 164 which extends inwardly from the wall of the bottom of the stripping vessel 154. The ledge may be a continuous annular ledge or it may be made up of a plurality of spaced ledges for supporting the lowest perforated partition member 162. The next higher perforated partition member 165 is provided with legs or pins 166 which extend down from the lower face of the plate member 165. These legs or pins 166 rest on the upper face of the lowermost plate member 162 and act to support the next higher plate 165 while at the same time spacing the plate 165 from the lowermost plate 162.

The remaining perforated plate members above the plates 162 and 165 just described are also provided with pins or legs for supporting the perforated plate members one above the other in spaced relation.

The stripped contaminated catalyst or contact particles leave the bottom of the stripping vessel 154 and pass into standpipe 167 provided with one or more fluidizing lines 168 for maintaining the solid particles in a dry liquid-simulating condition to develop hydrostatic pressure at the base of the standpipe. The particles leave the bottom of the standpipe through the opening in valve seat 170 controlled by a slide valve 172 for controlling the rate of withdrawal of solid particles from the bottom of the stripping vessel. The stripped contaminated catalyst particles are introduced into line 173 where they are mixed with a regenerating gas such as air introduced through line 174, and the less dense mixture is then passed to a regeneration zone (not shown) for regenerating the solid particles by burning off the combustible material. After regeneration the hot regenerated catalyst particles are returned to the reaction vessel 122 through line 132.

The particles in stripping section 154 are maintained in a fluidized dense condition but the density is less than the density of the fluidized dense mixture in standpipe 167 due to the introduction of a greater amount of gas through line 158. However, the stripping section 154 also functions as a standpipe.

The action of the stripping operation in the stripping vessel 154 is substantially the same as above described in connection with the stripping section shown in Fig. 1. The contaminated catalyst or contact particles flow down from the bottom of the reaction vessel 122 into the top portion of the stripping section 154 and the stream is first subdivided into a plurality of streams by the top perforated plate 176 which is preferably of subway grating construction. During passage as such confined streams, the contact particles are intimately contacted with stripping gas passing upwardly through the openings in the top perforated plate member 176.

The contact particles then converge into a single stream in the stripping space 178 below the top plate member 176 and are further contacted with upflowing stripping gas and the particles are maintained in a dense liquid-like turbulent condition so that extremely good mixing and stripping are obtained.

The solid particles then pass through the next lower perforated plate member 182 wherein the single stream is again subdivided into a plurality of smaller streams which are also contacted with upflowing stripping gas. The solid particles then pass to the stripping space 184 below the perforated plate member 182 where they converge into a single stream and into a fluidized liquid-like dense turbulent mixture. These series of steps are repeated as the solid particles flow downwardly through the separated perforated plates arranged one above the other in the stripping section 154.

The grating sections subdivide the stripping section into a plurality of zones to obtain a plurality of stripping stages with the grating sections preventing overall circulation of catalyst or contact particles in the stripping zone.

In Fig. 5 I have shown a top plan view of one of the perforated plate members used in the cylindrical stripping section 154. The top perforated plate member 176 is provided with spaced parallel strips of metal 186 and 188 which are connected to parallel spaced strips 192 and 194 arranged at right angles to the strips 186 and 188 to form rectangular cells 196. The construction shown in Fig. 5 is a subway grating type of construction. Other similar open mesh construction may be used.

Referring now to Fig. 4, the stripping gas passing upwardly through the stripping section or vessel 154 removes vapors from between the contact particles and the stripping gas together with the vapors removed from the catalyst mixture passes upwardly into the reaction vessel 122 and leaves the top of the vessel 122 through outlet 142. The superficial velocity of the stripping gas passing upwardly through the stripping vessel 154 is between about 0.5 ft./second and 2.0 ft./second. About 2 to 10 lbs. of steam per 1000 lbs. of fouled catalyst particles is preferably used. It is to be noted that the stripping gas has a slightly higher velocity in passing through the cells of the perforated partitions because the cross-sectional area of the stripping vessel 154 is reduced at these sections. After passing through the openings in the perforated plates and reaching the spaces between the individual perforated plates, the velocity of the gas is again slightly reduced.

The amount of particles flowing down through the stripping section 154 may be between about 100 to 1000 lbs./min./sq. ft. or higher, but preferably about 300 to 800 lbs./min./sq. ft.

The perforated partitions or sections comprising subway grating or a similar construction aid somewhat in the stripping operation. The ratio of the length of each cell or opening to the diameter of each cell or opening is advantageous for catalyst dispersion and stripping purposes, and some additional stripping is carried out in the perforated partitions in addition to the major part of the stripping obtained in the unobstructed spaces between the partitions or sections.

While the invention has been specifically described in connection with catalytic conversion reaction zones, it is to be understood that my improved stripping process may be used in connection with other processes where it is desired to strip volatile material from solid contact particles. In such a case the solid particles to be stripped are introduced into the upper portion of my improved stripping zone and the stripping gas and material stripped out from the solid particles is recovered separately and does not pass upwardly into a reaction zone. The stripping zone may be used alone and not be connected directly to a reaction zone or other contacting zone.

My improved stripping process may be used for stripping solid particles generally, and more specifically, for stripping removable materials from fluid hydroforming catalyst before regeneration or before reaction, similar materials from fluid polymerization catalyst before regeneration or reaction and likewise similar materials may be removed from dehydrogenation catalyst. Likewise, in processes wherein finely divided particles are oxidized by air, residual air and nitrogen may be removed, or when fluidized particles are reduced by oxidizable gases, such as hydrocarbon gases or carbon monoxide, excess reducing gas may be removed by this means. In processes wherein heat is transferred by fluidized particles, traces of the heating or cooling medium or gases associated therewith may be removed by this process.

In the catalytic cracking of hydrocarbons and in an apparatus such as shown in Fig. 1, the diameter of the reactor 10 is about 10-25 feet and the length of the reactor 10 is about 20-60 feet. In a reactor of this size the stripping zone or section 35 may be from about 8 to 16 feet in depth. The subway grating in each perforated partition may be made of strips having a depth from about 1½" to 3" but narrower or wider metal strips may be used, if desired. In one specific form of the invention, using subway grating, the average size of each rectangular opening is about 1" by 1⅞".

While I have shown several forms of my invention, it is to be understood that these are by way of example only and that various changes and modifications may be made without departing from the spirit of my invention.

What is claimed is:

1. An apparatus of the character described adapted for stripping volatile material from solid particles, comprising a vertical shell, an annular passageway inside said shell for the withdrawal of solid particles from the lower portion of said shell, a plurality of transverse sections of open-mesh grating, within said annular passageway, means for supporting said sections one above the other in spaced relation so that the sections are parallel and extend horizontally across said annular passageway, means for introducing solid particles to be stripped into the upper part of said annular passageway and means for introducing a stripping gas at at least one point into the lower part of said annular passageway whereby the introduced gas flows upwardly countercurrent to the introduced downflowing solid particles, said grating sections functioning to prevent undesired circulation of the solid particles in said vessel while permitting downward flow of solid particles and simultaneous upward flow of stripping gas.

2. An apparatus according to claim 1 wherein said transverse sections consist of subway grating, each section having a height of about 1½ to 3 inches.

CHARLES W. TYSON.

REFERENCES CITED

The following references are of record in the file of this patent:

UNITED STATES PATENTS

| Number | Name | Date |
|---|---|---|
| 1,191,753 | Wegner | July 18, 1916 |
| 1,558,119 | Sherban | Oct. 20, 1925 |
| 2,337,684 | Scheineman | Dec. 28, 1943 |
| 2,359,310 | Hemminger | Oct. 3, 1944 |
| 2,367,694 | Snuggs | Jan. 23, 1945 |
| 2,389,493 | Evans | Nov. 20, 1945 |
| 2,391,944 | Carlsmith | Jan. 1, 1946 |
| 2,394,814 | Snuggs | Feb. 12, 1946 |
| 2,415,755 | Ogorzaly et al. | Feb. 11, 1947 |
| 2,415,756 | Le Roi et al. | Feb. 11, 1947 |
| 2,433,798 | Voorhees | Dec. 30, 1947 |

FOREIGN PATENTS

| Number | Country | Date |
|---|---|---|
| 21,029 | Great Britain | Dec. 15, 1943 |